Oct. 2, 1928.
W. HENRY
1,686,450
LUGGAGE CARRIER
Filed March 28, 1925   2 Sheets-Sheet 1
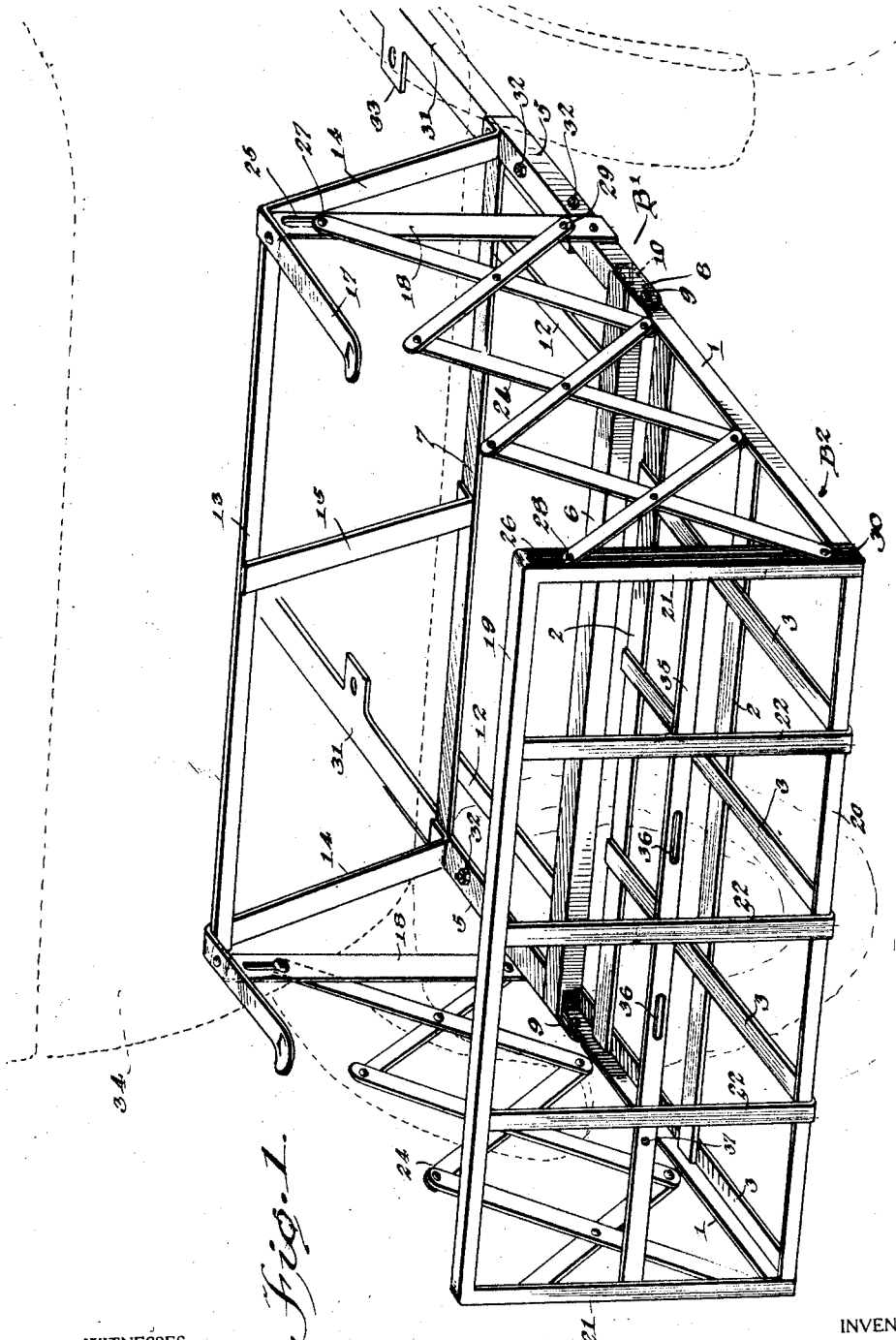
WITNESSES
INVENTOR
William Henry,
BY
ATTORNEYS

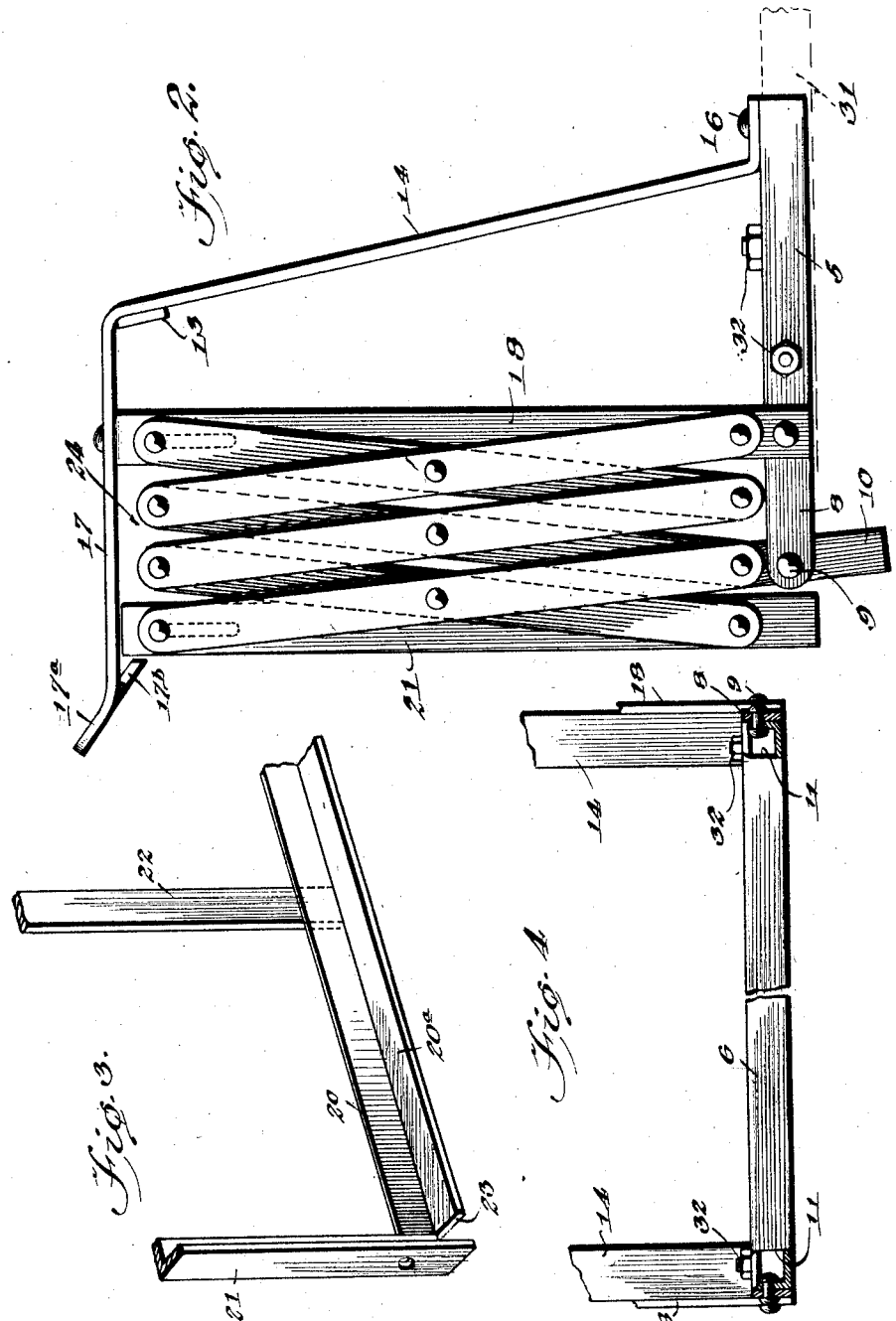

Patented Oct. 2, 1928.

1,686,450

UNITED STATES PATENT OFFICE.

WILLIAM HENRY, OF ROCKFORD, ILLINOIS.

LUGGAGE CARRIER.

Application filed March 28, 1925. Serial No. 19,138.

My invention relates to improvements in luggage carriers for vehicles of the class to which the carryall disclosed in Letters Patent of the United States, Number 1,489,527, granted to me April 8, 1924, belongs, and it consists in the combinations, constructions and arrangements herein described and claimed.

An object of the present invention is the provision of a luggage carrier of the character described which is attachable to an automobile or like vehicle, and is adapted to have a relatively great carrying capacity when extended and to take up but little space when folded.

A further object of the invention is the provision of a luggage carrier of the character described which has means acting automatically when the carrier is folded to hold the carrier folded firmly although releasably.

A further object of the invention is the provision of a luggage carrier of the character described which can be folded or extended quickly and easily, which will be well braced when in extended position, and which is thoroughly practical commercially.

Other objects and advantages of the invention will be apparent from the following description, considered in conjunction with the accompanying drawings, in which:

Figure 1 is a perspective view of the improved luggage carrier extended and in position to be secured to an automobile, the latter being indicated more or less diagrammatically by dash lines, Figure 2 is a side elevation of the carrier folded, Figure 3 is a fragmentary perspective view of a portion of the outer end of the carrier, and Figure 4 is a transverse vertical section through the bottom of the carrier, showing also in elevation fragmentary portions of certain members which are supported on said bottom.

The improved luggage carrier comprises a bottom consisting of an inner section B' and an outer section B² pivotally attached to each other to fold toward each other from extended alined position. The outer section B² comprises a pair of parallel side bars 1 connected by cross bars 2 which are in turn stayed to one another by longitudinal bars 3. The side bars 1 are right angular in cross section and each is disposed with one flange thereof horizontal and the other flange thereof vertical, the horizontal flanges being at the inner and lower sides of the bars 1 and being firmly secured to the cross bars 2 in any suitable known manner, preferably by spot welding. The outer of the cross bars 2 is connected to the side bars 1 inwardly of the outer ends of the side bars and the longitudinal bars 3 extend across the outer of the cross bars 2 and terminate at their outer ends flush with the outer ends of the side bars 1. The longitudinal bars 3 are secured to the cross bars 2 in any suitable known manner, preferably by spot welding.

The inner section B' also comprises a pair of side bars 5, connected and held in spaced parallel relation by an outer cross bar 6 and an inner cross bar 7. The side bars 5 are right angular in cross section and each is arranged with one flange thereof horizontal and at the inner and upper side of the side bar while the other flange thereof of course is vertical. The vertical flanges of side bars 5 extend beyond the outer ends of the horizontal flanges of the same side bars and as indicated at 8, extend also beyond the adjacent ends of corresponding side bars 1 at the outer sides of the vertical flanges of the latter, the lapped portions of the vertical flanges of corresponding side bars 1 and 5 being attached to each other by a horizontal pivot element 9, the respective pivot elements 9 being axially alined, whereby the hereinbefore mentioned pivotal connection between the sections B' and B² of the bottom of the carrier is effected.

The extending inner end portions of the side bars 1 are indicated at 10 and are adapted to swing to position to abut the horizontal flanges of the side bars 5 when the carrier bottom is extended and corresponding bars 1 and 5 are substantially alined as illustrated in Figure 1, and to then brace the outer section B² against further swinging movement downward about the axis of the pivot elements 9 and relatively to the inner section B' of the carrier bottom. The outer cross bar 6 of the inner section B' is shown as being angular in cross section and has the end portions of the vertical flange thereof cut away as indicated at 11 to permit the inner end portions 10 of the side bars 1 to swing to and from position to abut the horizontal flanges of the side bars 5. The cross bars 6 and 7 are stayed to each other by longitudinal bars 12.

The inner end member of the carrier comprises an upper cross bar 13, which is supported in spaced parallel relation to the plane of the inner section B' of the bottom at the inner end of the latter by a pair of end supporting bars 14 and an intermediate supporting bar 15. The bars 14 and 15 are inclined outward slightly. The bars 13 are secured at their lower ends by rivets 16 upon the inner end portions of the side bars 5 and have substantially horizontal outwardly extending spring extensions 17 at their upper ends. The spring extensions 17 therefore extend above and substantially parallel to the side bars 5. The vertical standards 18 connect the spring extensions 17 to the underlying side bars 5, the outer end portions of the spring extensions being free, and being turned slightly upward adjacent to their extremities as indicated at 17$^a$. Each spring extension 17 has a downwardly and inwardly inclined tongue-like projection 17$^b$ struck therefrom at the inner end of the upwardly turned end portion 17$^a$ for a purpose to be presently stated.

The outer end of the carrier comprises an upper cross bar 19, a lower cross bar 20, vertical end supporting bars 21 and other spaced vertical supporting bars 22 cooperating with end supporting bars 21 to firmly stay the upper cross bar 19 and the lower cross bar 20 to each other. The lower cross bar 20 and the end supporting bars 21 are right angular in cross section. The lower cross bar 20 is supported with a flange thereof horizontal and at the lower and inner side thereof as indicated at 20$^a$, said horizontal flange providing a support for the extending outer end portions of the longitudinal bars 3 and having the end portions thereof cut away as indicated at 23 to provide clearance for the outer ends of the side bars 1 when the respective vertical supporting bars 21 are connected with the corresponding vertical bars 18 by lazy tongs 24. The lazy tongs thus serve as the side members of the carrier. The vertical bars 18 and 21 have the upper end portions thereof formed with vertical slots 25 and 26, respectively in which the horizontal pivot pins 27 and 28 respectively which are carried at the upper sides of opposite ends of each set of lazy tongs 24 may slide. The opposite ends of each set of lazy tongs are connected at the lower sides with the lower end portions of the vertical bars 18 and 21 by horizontal pivot elements 29 and 30 respectively.

From the foregoing description of the various parts of the device, the operation thereof may be readily understood. Rigid attachings bars 31 may be secured by bolts and nuts 32 or like means to the side bars 5 and may extend beyond the free ends of the latter and be adapted, as by having apertured lugs 33, for attachment to the frame of an automobile 34 or like vehicle so that the bottom of the inner section B' of the bottom of the carrier will be supported in a substantially horizontal plane at the rear of the automobile close to the latter. When the carrier is extended as shown in Figure 1, the outer section B$^2$ of the bottom of the carrier will lie in the plane of the inner section B', the lazy tongs 24 will be extended and constitute the sides of the carrier, and the carrier will be adjusted to hold a relatively large number of articles or an article of relatively great size. The outer end of the carrier may include an intermediate cross bar 35 which may be provided with slots 36 for engaging with means (not shown) for supporting an automobile license plate, also not shown. Thus cross bar 35 also may be apertured, as at 37, for engagement with an automobile tail light holder, (not shown).

When desired, the carrier may be folded quickly and easily from the position shown in Figure 1 to the position shown in Figure 2 and will be releasably held in the last named position by reason of the engagement of the projections 17$^b$ on the spring extensions 17 with the upper cross bar 19 of the outer end of the carrier. The upturned portions 17$^a$ of the spring extensions 17 serve to guide the upper cross bar of the outer end of the carrier to position inwardly of the projections 17$^b$ when the carrier is being folded and also serve as handles adapted to be conveniently manipulated to spring the extensions 17 upward when it is desired to release the outer end of the carrier so that said carrier can be extended.

Obviously, the invention is susceptible of embodiment in forms other than that which is illustrated in the accompanying drawings, and I therefore consider as my own all such modifications and adaptations thereof as fairly fall within the scope of the appended claims.

I claim:—

1. A luggage carrier comprising a bottom comprising an inner end section and an outer end section, each having a pair of side bars and connecting and brace bars, the adjacent end portions of corresponding side bars of the two sections being juxtaposed and being connected by alined horizontal pivot elements, said sections including cooperative means for preventing downward swinging movement of the outer section about the axis of said pivot elements beyond the plane of the inner section, a pair of uprights rigid with the inner section of the bottom at opposite sides of and adjacent to the inner end of the latter, an outer end for the carrier, said outer end being free from the bottom, and lazy tongs connecting the respective uprights with opposite ends of said outer end members, said lazy tongs supporting said outer end member at the outer end of the bottom when the lazy tongs and the bottom are extended and permitting swinging of the outer section of the bottom upward and inward from the plane of the inner section of the bottom, said outer end member having an inwardly extending horizontal supporting flange at its lower edge on which the outer end portion of said outer end section of the bottom rests when said bottom and the lazy tongs are extended.

2. A luggage carrier comprising a transversely foldable bottom, a pair of uprights at the sides of and adjacent to the inner end of said bottom, said uprights having vertical slots in the upper end portions thereof, an outer end member including a pair of end uprights having slots in the upper end portions thereof and a cross bar extending between said second named uprights, lazy tongs connecting corresponding first and second named uprights, said lazy tongs having pivot elements at the upper sides of the opposite end portions thereof pivotally and slidably engaged with said slots and having pivotal connections at the lower sides of the opposite end portions thereof with the lower end portions of said corresponding uprights, and outwardly extending spring latching bars at the upper ends of said first named uprights for engaging said cross bar of the outer end member of the carrier when the lazy tongs are folded, said spring latching bars having the outer end portions thereof turned upward to provide combined guides and handles and having downwardly and inwardly inclined latching projections struck therefrom at the inner ends of said handle portions and adapted to hook over said cross bar of the outer end of the carrier automatically when the lazy tongs are folded.

WILLIAM HENRY.